(12) United States Patent
Jackson, Jr. et al.

(10) Patent No.: US 7,226,260 B2
(45) Date of Patent: Jun. 5, 2007

(54) SHEET METAL FASTENING CLIP

(75) Inventors: Nicholas Jackson, Jr., Davisburg, MI (US); Rene Dreiocker, Rochester Hills, MI (US); Michael Osswald, Rochester Hills, MI (US)

(73) Assignee: A. Raymond, Inc., Rochester Hills, MI (US)

( * ) Notice: Subject to any disclaimer, the term of this patent is extended or adjusted under 35 U.S.C. 154(b) by 0 days.

(21) Appl. No.: 11/138,562

(22) Filed: May 26, 2005

(65) Prior Publication Data

US 2005/0271492 A1 Dec. 8, 2005

Related U.S. Application Data

(63) Continuation-in-part of application No. 10/813,205, filed on Mar. 30, 2004, now abandoned, which is a continuation-in-part of application No. 10/603,017, filed on Jun. 24, 2003, now abandoned.

(60) Provisional application No. 60/390,946, filed on Jun. 24, 2002.

(51) Int. Cl.
*F16B 37/04* (2006.01)
(52) U.S. Cl. .................. 411/173; 411/112; 411/182
(58) Field of Classification Search ................ 411/173, 411/182, 111, 112, 508, 913, 456
See application file for complete search history.

(56) References Cited

U.S. PATENT DOCUMENTS

| 1,768,505 | A | | 6/1930 | Carr |
|---|---|---|---|---|
| 2,283,122 | A | | 5/1942 | Murphy |
| 2,295,480 | A | | 9/1942 | Johnson |
| 2,406,415 | A | | 8/1946 | Tinnerman |
| 2,633,174 | A | | 3/1953 | Poupitch |
| 3,182,544 | A | | 5/1965 | Rapata |
| 3,373,789 | A | | 3/1968 | Parkin et al. |
| 3,426,817 | A | | 2/1969 | Parkin et al. |
| 3,645,311 | A | * | 2/1972 | Tinnerman .................. 411/173 |
| 3,795,890 | A | | 3/1974 | Van Buren, Jr. |
| 3,893,211 | A | | 7/1975 | Skinner |
| 4,300,865 | A | * | 11/1981 | Murray ........................ 411/15 |
| 4,595,325 | A | * | 6/1986 | Moran et al. ............... 411/173 |
| 4,606,688 | A | * | 8/1986 | Moran et al. ............... 411/175 |
| 4,610,588 | A | * | 9/1986 | Van Buren et al. ......... 411/173 |
| 5,173,025 | A | | 12/1992 | Asami |
| 5,593,263 | A | * | 1/1997 | Clinch et al. ............... 411/182 |
| 5,906,346 | A | | 5/1999 | Lin et al. |
| 6,976,292 | B2 | * | 12/2005 | MacPherson et al. ......... 24/293 |

FOREIGN PATENT DOCUMENTS

WO    WO 03/021112 A2    3/2003

\* cited by examiner

*Primary Examiner*—Flemming Saether
(74) *Attorney, Agent, or Firm*—Dickinson Wright PLLC

(57) ABSTRACT

The present invention provides a fastener mounting clip for use in securing a fastener to sheet material having a bore hole formed therein. The fastener mounting clip is preferably formed of a single sheet of thin spring steel. The mounting clip includes a rectilinear planar surface having opposing retainer arms extending beneath its outer edge at obtuse angles. The retaining arms are resiliently flexible and compress and expand during insertion wherein a top end of the retaining arm abuts against the sheet material when the fastener mounting clip is fully seated within the bore hole. The planar surface includes support tabs for supporting the planar surface in the plane of the sheet material and also includes a recessed aperture for receiving and retaining a fastener therein.

25 Claims, 9 Drawing Sheets

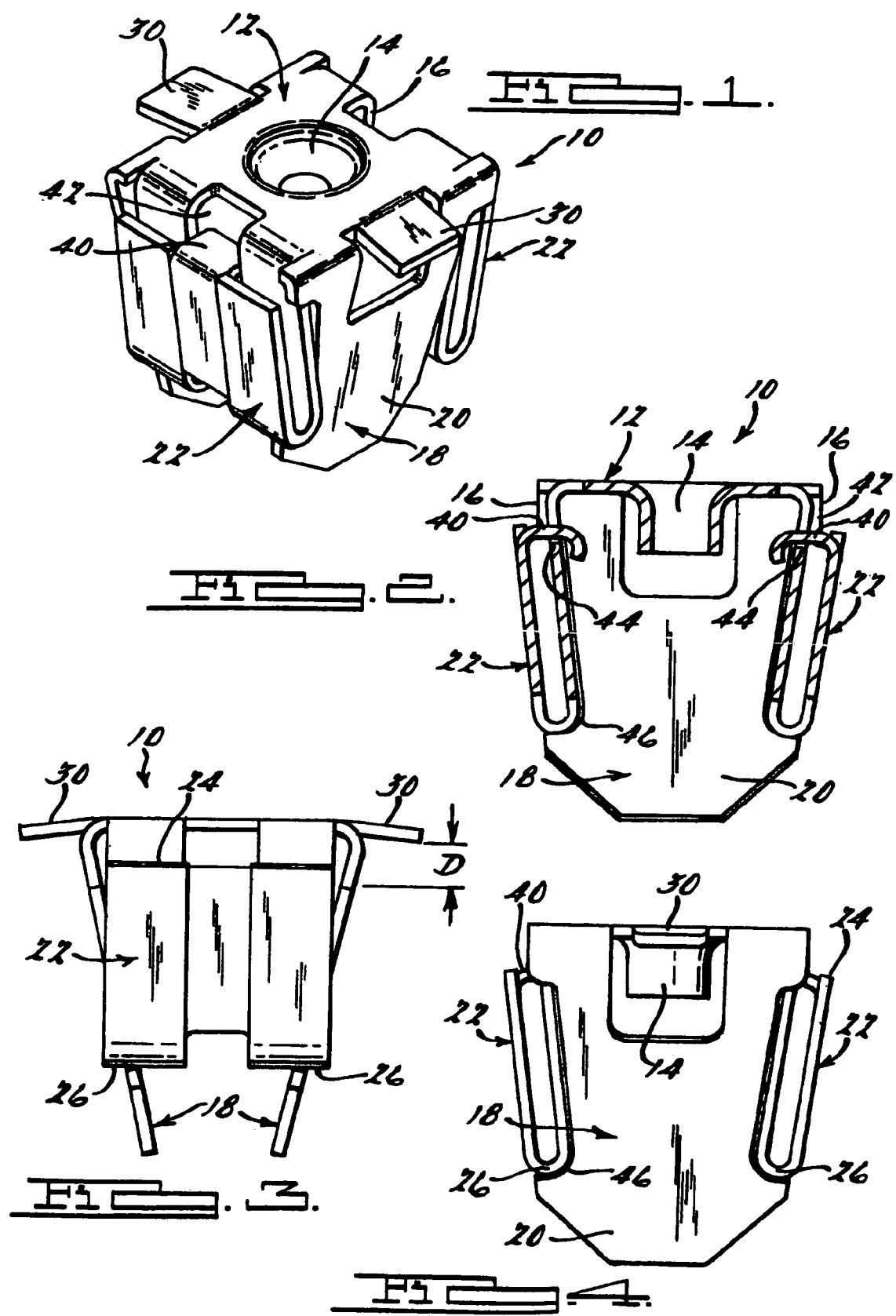

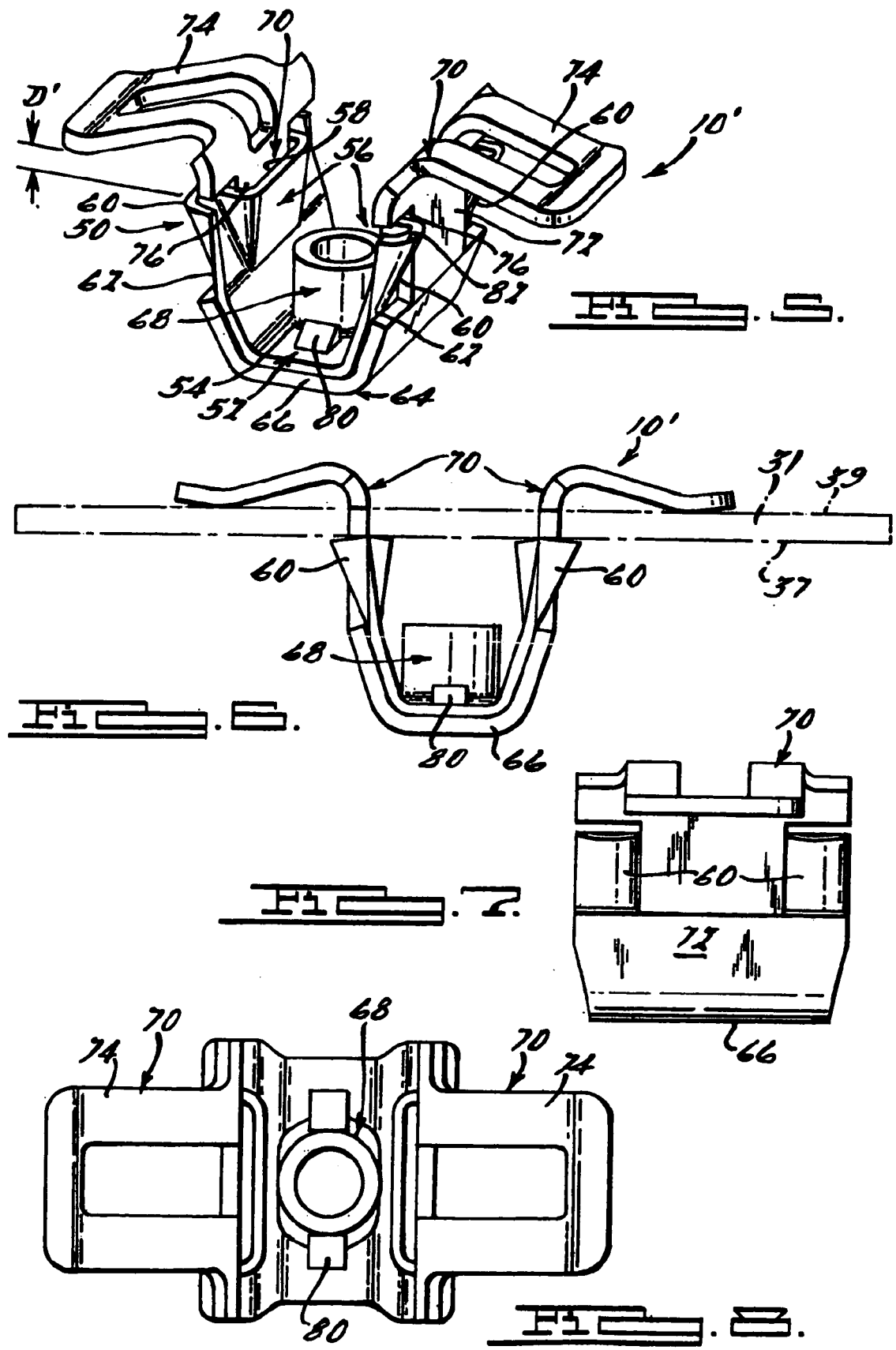

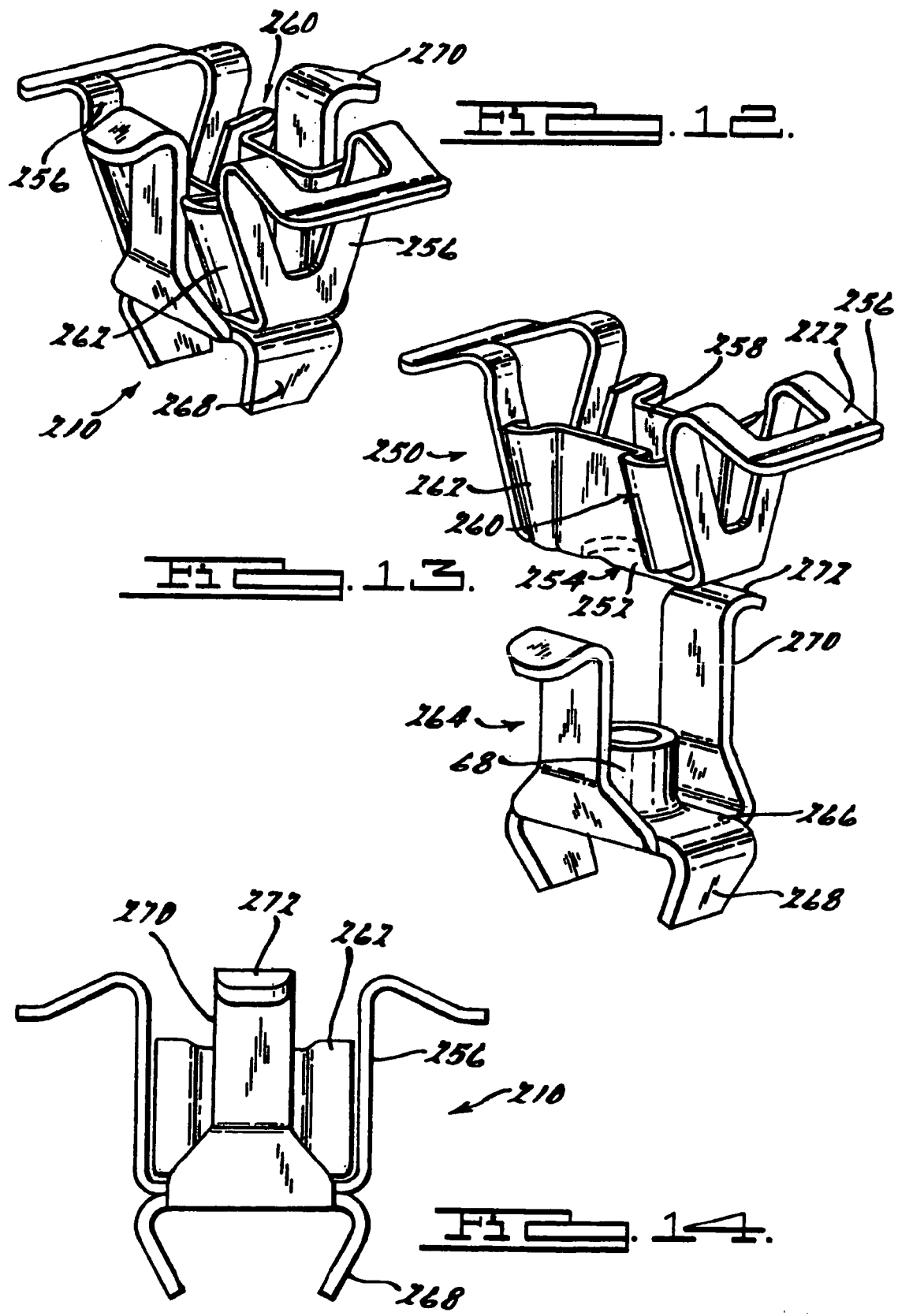

SHEET METAL FASTENING CLIP

RELATED APPLICATION

The application is a continuation-in-part of U.S. patent application Ser. No. 10/813,205, filed Mar. 30, 2004 now abandoned, which is a continuation-in-part of U.S. patent application Ser. No. 10/603,017, filed Jun. 24, 2003 now abandoned, which claims priority of U.S. Provisional Patent Application Ser. No. 60/390,946 filed Jun. 24, 2002.

FIELD OF THE INVENTION

The present invention relates to mounting clips for securing fasteners to sheet metal and more particularly to a fastener mounting clip that can be inserted into a bore hole formed in sheet metal material.

BACKGROUND OF THE INVENTION

Sheet metal nuts or mounting clips are used in the automobile industry as well as in the household appliances industry for fastening trim work or other components to the sheet metal body. Many conventional sheet metal nuts are designed to be pushed onto the edge of a sheet material work-piece having a hole adjacent thereto until a hole of the sheet metal nut and the work-piece coincide.

However, many motor vehicle construction processes require that trim work or other components be fastened to the interior vehicle chassis, exterior body panels or other fastening points which do not lie at the edge of the sheet material or work-piece but in other areas of the work-piece surface, such as the middle. For this case, the present invention provides a sheet material mounting clip that may be received into a bore hole formed in the sheet material and operative to be easily inserted while providing a substantial resistance to pull out forces.

SUMMARY OF THE INVENTION

The present invention provides a fastener mounting clip for securing a fastener in a bore hole formed in sheet materials such as sheet metal or the like. The mounting clip is formed for easy insertion with low insertion forces and to provide high resistance to extraction forces. The fastener mounting clip includes a planar surface having an outside edge and a recessed aperture formed central to the planar surface. The bore hole is operative to receive and retain a conventional fastener therein for securing various objects such as trim material to the sheet material. The bore hole has rectangular corners. Retaining arms are formed to engage the sheet metal at the rectangular corners of the hole to utilize the relative strength of the corners to resist extraction.

Two elongated guide arms are formed on the outside edge of the planar surface. The guide arms stand spaced apart in an opposing fashion and extend beneath the planar surface at an obtuse angle. The guide arms are operative to guide the mounting clip into the bore hole formed in the sheet material.

Two resilient retaining arms are also formed in opposing fashion on the outside edge of the planar surface. The arms stand spaced apart in an opposing fashion and also extend beneath the planar surface at an obtuse angle that is preferably equivalent to the obtuse angle of the guide arms. The retaining arms are operative to compress and expand upon insertion of the fastener mounting clip into the bore hole formed in the sheet material. After insertion of the fastener mounting clip into the bore hole, the top sides of the expanded retaining arms abut against a surface of the sheet metal and provide resistance to pull-out forces. The corners of the sheet metal about the bore hole have a greater resistance to deformation than edges of the sheet metal between the corners. Thus, by engaging the sheet metal at the corners of the bore hole, the mounting clips provide greater extraction forces.

At least two support tabs extend outwardly from the outside edge of the planar surface preferably in opposing directions such that the two tabs would be spaced apart substantially at 180 degrees. The tabs are operative to abut against an opposing surface of the sheet metal relative to the surface in contact with the retaining arms after the fastener mounting clip has been fully inserted into a bore hole of the sheet metal. The tabs are operative to prevent the mounting clip from passing through the bore hole during insertion and to stabilize the mounting in the sheet material.

BRIEF DESCRIPTION OF THE DRAWINGS

A better understanding of the present invention will be had upon reference to the following detailed description when read in conjunction with the accompanying drawings in which like parts are given like reference numerals and wherein:

FIG. 1 is a perspective view of the first preferred embodiment of the fastener mounting clip for sheet material;

FIG. 2 is a cross-sectional view of the fastener mounting clip of FIG. 1 of the first preferred embodiment of the invention;

FIG. 3 is a side view of the fastener mounting clip illustrating the retaining arms as according to the first preferred embodiment of the invention;

FIG. 4 is a side view of the fastener mounting clip illustrating the guide arms as according to the first preferred embodiment of the invention;

FIG. 6 is a side view of the first alternative preferred embodiment of the fastener mounting clip assembly disposed in a bore hole formed in a piece of sheet material;

FIG. 7 is an end view of the first alternative preferred embodiment of 15 the fastener mounting clip assembly as according to the invention;

FIG. 8 is a top view of the first alternative preferred embodiment of the fastener mounting clip assembly as according to the invention;

FIG. 8A is a top view of the first alternative preferred embodiment of the clip shown in position in the bore hole of the sheet metal;

FIG. 12 is a perspective view of a third alternative preferred embodiment of the fastener mounting clip assembly taken from above;

FIG. 13 is an exploded perspective view of the third preferred embodiment of the mounting clip;

FIG. 14 is a side view of the third preferred embodiment of the mounting clip showing the clip in the environment.

DETAILED DESCRIPTION OF THE INVENTION

Figure 4A:
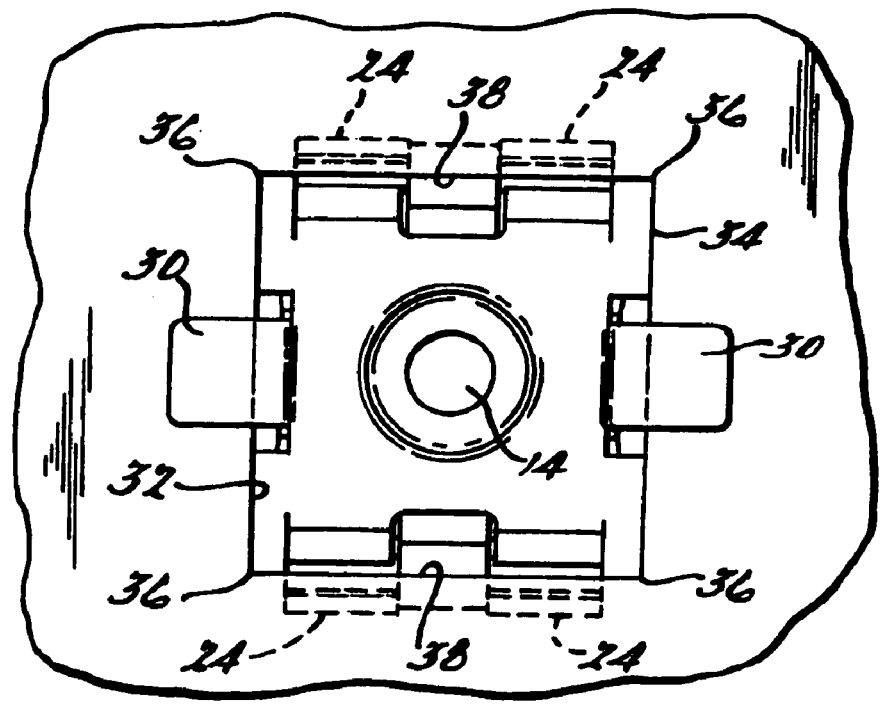
FIG. 4A is a top view of the fastener mounting clip in position in a bore hole according to the first preferred embodiment of the invention.

The present invention provides a novel fastening clip for use in providing a mounting for fasteners used to fasten objects to sheet material bodies having bore holes formed therein. The fastener mounting clips are operative to require low insertion force and to provide high retention force. Thus, the inventive fastener mounting clips are easily installed and mount securely to sheet materials having bore holes formed therein.

As shown in FIGS. 1–4, the preferred embodiment of a fastener mounting clip 10 is formed from a single sheet of metal such as spring steel, aluminum, tin or copper for insertion into an aperture.

The fastener mounting clip 10 includes a planar surface 12 preferably formed in a rectilinear shape. However, it is appreciated that various other shapes may be suitable for the intended purpose without exceeding the scope of the invention.

The planar surface 12 includes a nut base 14 formed central thereto that is dimensioned to receive and retain a complementary fastener therein. The nut base 14 may be threaded, barded, or provide any other complementary engagement means for securing a conventional fastener.

At least two elongated guide arms 18 extend from and beneath an outside edge 16 of the planar surface 12. Each guide arm 18 includes a U-shaped free end 20 operative to guide the fastener mounting clip 10 into a bore hole formed in the sheet material. The free end 20 of each guide arm 18 may alternatively be formed into a V shape or truncated V shape or any other shape that would provide the benefit of minimizing the amount of insertion force required for installing the fastener mounting clip 10 into a rectangular aperture 32 formed in the sheet material. Preferably, the guide arms 18 are spaced apart at approximately 180 degrees in an opposing fashion. Although two guide arms 18 are preferable, the inventive fastener mounting clip 12 could be made operable with at least one guide arm 18.

At least two resilient retaining arms 22 are also formed on the outside edge 16 of the planar surface 12. The retaining arms 22 extend beneath the planar surface 12 similar to the guide arms 18. Preferably, the retaining arms 22 include a top end 24 and a bottom end 26 which are essentially the extreme ends of the retaining arms 22 that are preferably formed to resemble elongated loops. The retaining arms 22 are operative to compress and expand upon insertion of the fastener mounting clip 10 into the aperture 32 formed in the sheet material wherein the top ends 24 of the retaining arms 22 abut against a bottom surface of the sheet material when the fastener mounting clip 10 is fully inserted into the aperture 32. The top ends 24 of the retaining arms extend along under a perimetal edge 38 of the aperture between corners 36 of the aperture 32. The corners of the aperture are more resistant to bending than the perimetal edge between corners 38. Thus, when the clip is subjected to an extraction force, engagement of the corners provides high resistance to extraction forces.

As best shown in FIGS. 1 and 2, the retaining arms 22 through an aperture 42 and over an inner portion 44 in an inverted U shape. The keeper 40 holds the retaining arms 22 and the top keeper arm extends from ends 24 from outward deformation to resist extraction and deformation against extraction forces.

The bottom end 26 of the retaining arms 22 are shrouded by a complimentary recess 46 formed in the U-shaped free ends 20 of the guide arms 18. The recess 46 protects the retaining arms 22 of the fastener mounting clip against deformation by insertion forces acting on the bottom end 26 during insertion and supports the retaining arms against the sheet metal to resist extractions. It is appreciated that although the preferred embodiment employs two retaining arms 22, the inventive fastener mounting clip 10 could be made operative with at least one retaining arm. The retaining arms 22 are preferably arranged in opposing fashion and complementary to the guide arms 18 such that the retaining arms 22 also stand substantially 180 degrees apart.

At least two support tabs 30 extend outwardly from the outside edge 16 of the planar surface 12. Preferably, the tabs 30 are arranged in an opposing fashion such that they extend outwardly from the planar surface 12 at substantially 180 degrees. The support tabs 30 are operative to abut against a top surface of the sheet material when the fastener mounting clip 10 is fully inserted into the aperture 32 formed in the sheet material. As such, the fastener mounting clip 10 is securely retained in the bore hole formed in the sheet material wherein the top ends 24 of the retaining arms 22 abut against the bottom surface of the sheet material adjacent the corners and wherein the support tabs 30 abut against the top surface of the sheet material. In this fashion, the fastener mounting clip 10 has high resistance to extraction forces. The tabs also serve to stabilize the fastener mounting clip 10 within the bore hole.

It is appreciated that the fastener mounting clip 10 includes a spaced distance D between the support tabs 30 and the top ends 24 of the retaining arms 22 wherein the distance D approximates the thickness of the sheet material for which the fastener mounting clip 10 is to be used. This distance D and the resiliency of the support tabs 30 are operative to compensate for surface inconsistencies as well as to ensure that the sheet material will be snugly sandwiched between the top ends 24 of the retaining arms 22 and the support tabs 30 after the fastener mounting clip 10 has been inserted into the aperture.

Referring now to FIGS. 3 and 4, the side views of the fastener mounting clip 10 illustrate the retaining arms 22 and guide arms 18, respectively, extending beneath the planar surface 12 at obtuse angles. Preferably, the obtuse angles range between 90 and 120 degrees. Most preferably, the angles range between 95 and 105 degrees. It is appreciated that other angles that exceed these ranges may be suitable, however, without exceeding the scope of the invention.

FIGS. 5–8A illustrate a fastener mounting clip assembly 10' as a first alternative preferred embodiment to the above fastener mounting clip 10 that is formed of sheet material. A thread fastener may be inserted into the clip before installing the clip 10' into the aperture 32. As shown best in FIG. 8A, wedge portions 60 are formed to engage an underside 37 of the sheet metal 31 about the corners 36 of the aperture 32.

Figure 5A:
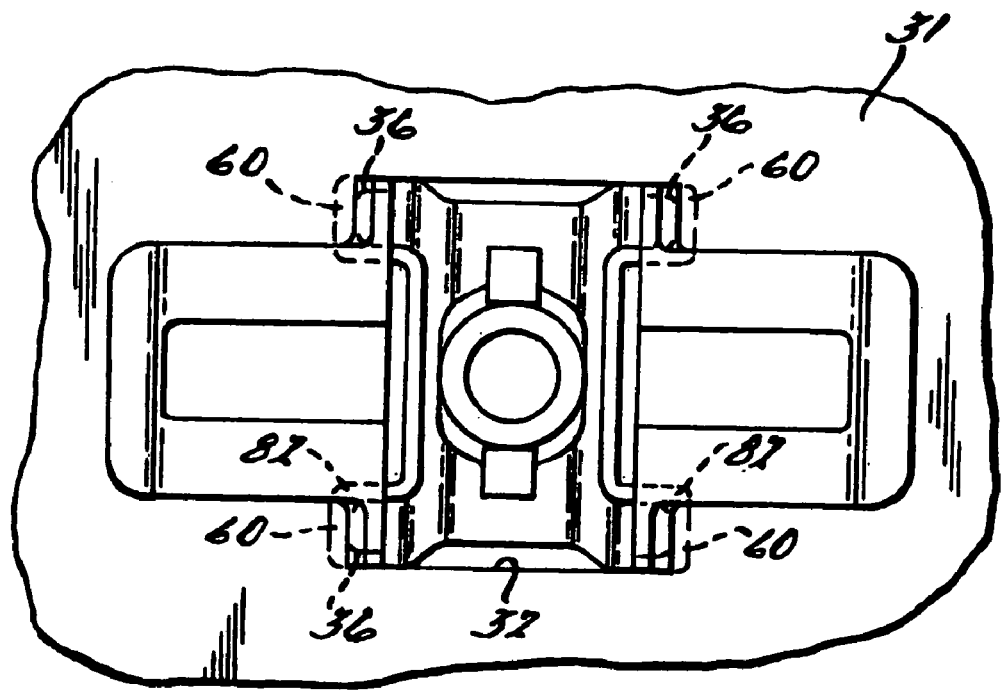
FIG. 5 is a perspective view of a first alternative preferred 10 embodiment of the fastener mounting clip comprised of a two-piece assembly.

As best illustrated in FIG. 5, the fastener mounting clip assembly 10' includes a U-shaped retainer portion 50 and a U-shaped carrier portion 64. The U-shaped retainer portion 50 includes a U-base 52 having an aperture 54 formed at its center. Extending upwardly from the U-base 52 are opposing spring arms 56. Each spring arm 56 includes a U-shaped notch 58 formed between two retaining wedges 60 that extend along the outer edges of the spring arms 56. Each of the retaining wedges 60 has a tapered end adjacent to the U-base 52. The U-base 52 of the U-shaped retainer portion 50 preferably includes at least one tab 80 disposed adjacent the aperture 54 formed therein for the purpose to be described hereinafter.

The U-shaped carrier portion 64 is dimensioned to engage the U-shaped retainer portion 50 in a complementary fashion wherein the U-base 52 of the U-shaped retainer portion 50 seats within the carrier base portion 66 of the U-shaped carrier portion 64.

Extending upwardly from the carrier base 66 is a protruding cylindrical nut base 68 formed central thereto. The cylindrical nut base 68 is dimensioned to be received through the aperture 54 formed in the U-base 52 of the U-shaped retainer portion 50. The protruding cylindrical nut base 68 has a threaded bore operative to receive and retain a fastener in complementary therein.

As described above, at least one tab 80 is disposed at the center aperture 54 of the U-base 52 of the U-shaped retainer portion 50 to lock the carrier 54 portion to the retainer portion 50. The stabilizer tabs 80 are operative to retain and stabilize the protruding cylindrical aperture 68 of the U-shaped carrier portion 64 upon assembly of the fastener mounting clip assembly 10' as according to the invention.

The U-shaped carrier portion 64 includes opposing inverted L-shaped arms 70 having a body portion 72 and a base portion 74. The body portion 72 of the opposing inverted L-shaped arms 70 extends upwardly from the carrier base 66 while the base portions 74 extend outwardly from the carrier base 66 in a winged fashion.

The body portion 72 of the inverted L-shaped arms 70 each include bilateral notches 76 such that the body portion 72 appears to have an I-beam shape. The bilateral notches 76 are dimensioned to interlockingly engage the retaining wedges 60 of the spring arms 56 after assembly. In this manner, the U-shaped retainer portion 50 and the U-shaped carrier portion 64 form the fastener mounting clip assembly 10' as according to the invention.

As shown in FIG. 8A, the fastener mounting clip assembly 10' is dimensioned to be received in the aperture 32 formed in the sheet material such that the retaining wedges 60 compress to permit insertion then deform outwardly to abut against a bottom surface of the sheet material. The wedges 60 have a curved top edge 82 which extends about the corners 36 of the aperture 32 when the fastener mounting clip assembly 10' is properly seated within the aperture 32.

Additionally, the base portion 74 of the inverted L-shaped arms 70 abuts against a top surface 39 of the sheet material after proper insertion of the Fastener mounting clip assembly 10' as according to the invention. It is appreciated that a distance D' exists between the top surface of the retaining wedges 60 and the base portion 74 of the inverted L-shaped arms 70 such that the sheet material having a thickness approximately equal to the distance D' may be snugly positioned therebetween. The resiliency of the base portion 74 of the inverted L-shaped arms 70 allows for inconsistencies in the thickness of sheet materials for which the fastener mounting clip assembly 10' is to be used.

Preferably, the fastener mounting clip assembly 10' is formed of spring steel, aluminum or copper. However, it is appreciated that other materials such as resiliently rigid plastic materials may be constructed and made suitable for the intended purpose as according to the invention.

Figure 9:
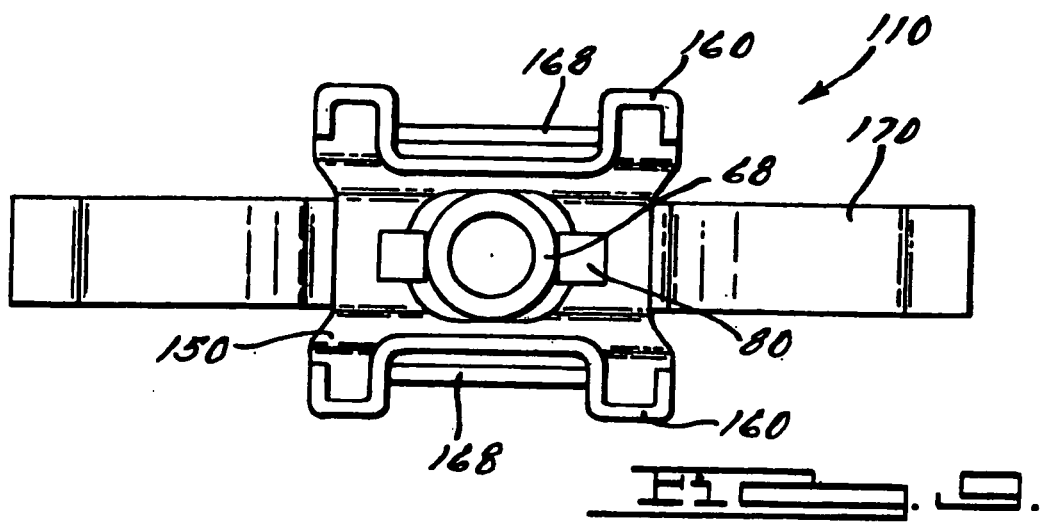
FIG. 9 is a top view of a second alternative preferred embodiment of the invention.
Figure 10:
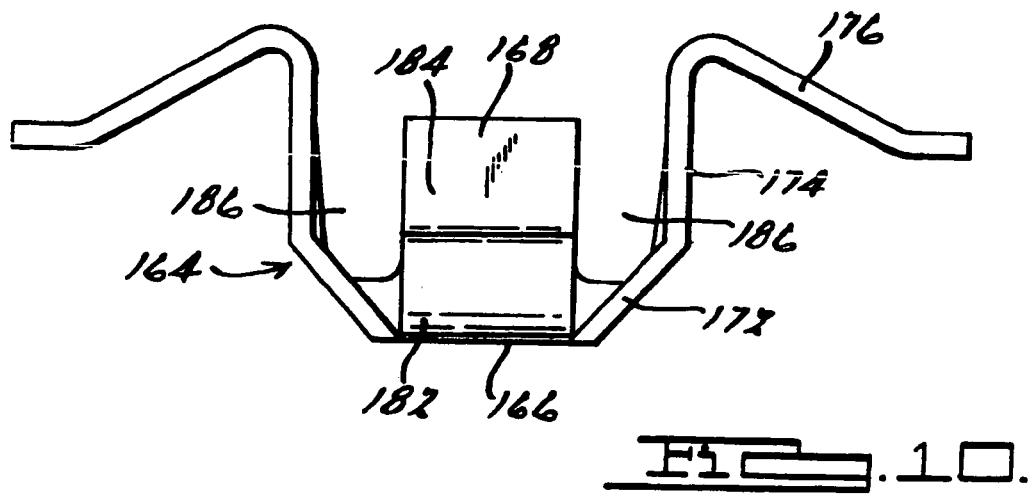
FIG. 10 is a side view of the second alternative preferred embodiment of the fastener.
Figure 11:
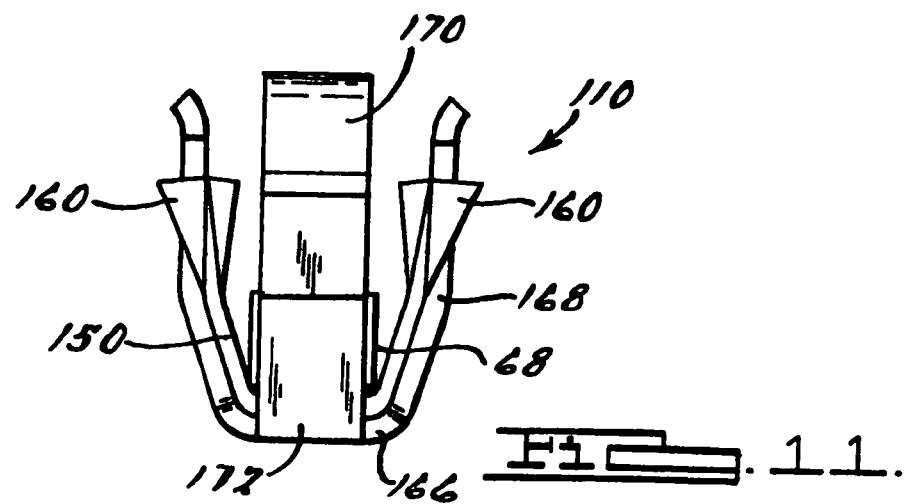
FIG. 11 is an end view of the second alternative preferred embodiment of the fastener mounting clip assembly.

As best shown in FIGS. 9–11, a second alternative preferred embodiment of the invention includes a retaining mounting clip assembly 110 formed similarly to the first alternative preferred embodiment fastener mounting clip assembly 10'. As best shown in FIGS. 10 and 11, the mounting clip assembly 110 has a retainer 150 and a carrier 164. The retainer is similar to the retainer portion 50 of the first alternative embodiment but has wedges 160 which have a somewhat greater flare than the wedges 60 of the first alternative preferred embodiment.

As shown in FIGS. 10 and 11, the carrier 164 has an opposed pair of arms 170 and an opposed pair of walls 168 which extend from a base portion 166. The arms 170 have a lower angled portion 172, a center portion 174 and an L-shaped upper portion 176 which engage the upper surface of the sheet metal as above. A nut base 164 is formed on the center portion 174 and extends through a through bore in the carrier 164. The walls 168 have a lower angled portion 182 and an upper portion 184 with bilateral gaps 186 firmed to receive the wedges 160 as above. The center portions 174 of the arms 170 and the upper portions 184 of the walls 168 abut against the edges of the aperture 32 to locate the clip assembly 110. The lower portions 172 of the arms and the lower portions of walls 168 of the walls 172 of the carrier 164 angle outwardly and upwardly guide the clip assembly 110 during insertion of the clip in the aperture 32. The carrier 164 is mounted to the retainer 150 in the same fashion as before except that the wedges 160 extend through the gaps 186 in the wall 168. Installation and operation of the clip assembly 110 are just as described above for the first alternative preferred embodiment of the invention.

Figure 15:
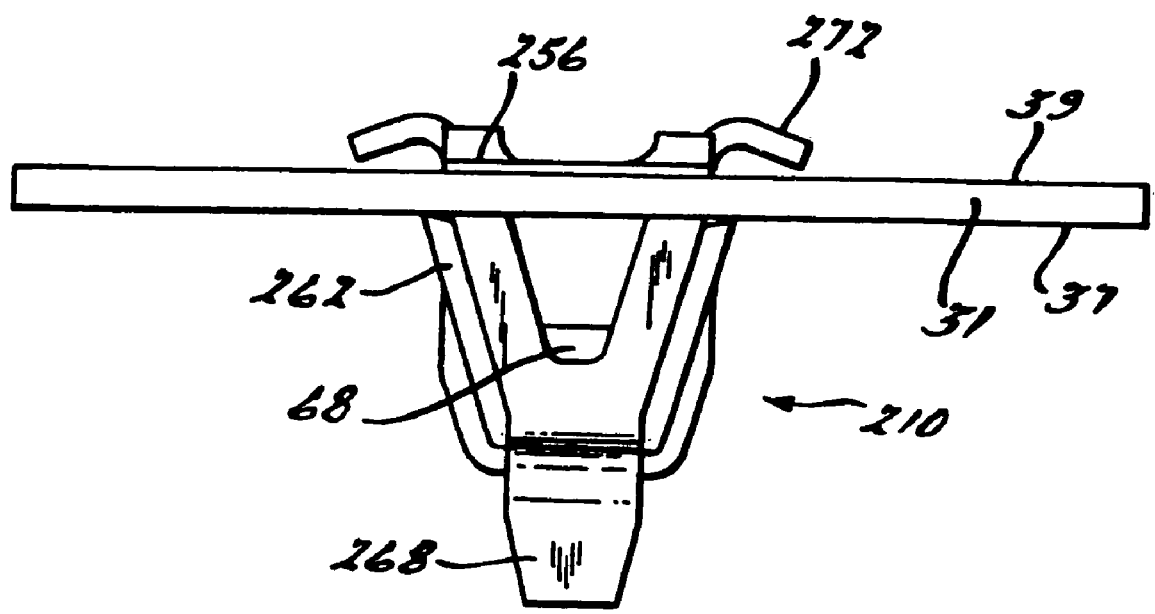
FIG. 15 is a side view rotated 90 degrees from FIG. 14 of the third 10 preferred embodiment of the mounting clip.

A third preferred embodiment of a mounting clip 210 is shown in FIGS. 12-15. Like the preceding embodiments, the mounting clip 210 is formed of two pieces, namely a carrier 264 and a retainer 250. As shown in FIG. 13, the retainer 250 has a generally rectangular lower center portion 252 with an aperture 254 for receiving the nut base 68 of the carrier 264. A pair of retaining arms 222 extend upwardly from opposed sides of the center portion 252. L-shaped upper portions 256 of the arms engage the upper surface 39 of the sheet metal as above (FIG. 15). A pair of side walls 258 extend upwardly from an other pair of opposed sides of the center portion 252. Each side wall 258 has a center upright portion 260 extending between a pair of wedges 262 which engage the lower surface 37 of the sheet metal as before.

As shown in FIGS. 13 and 15, the carrier member 264 includes a rectangular center portion 266 with the nut base 68, a pair of guide arms 268 and a pair of upper arms 270. The guide arms 268 extend downwardly at an angle from opposed sides of the center portion 266. The guide arms form a truncated V to guide the retaining clip 210 into the aperture. The pair of upper arms 270 extend from the other pair of opposed sides of the center portion 266. The upper arms are L-shaped and have a distal portion 272 which contact the upper portion of the aperture. The lower portions of the locking arms 270 are spaced apart a distance equal to the width of the aperture to position the clip 210 in the aperture.

As shown in FIG. 14, the retainer 250 is received between the arms of 5 the carrier 264 with the nut base 68 extending up through the aperture 254. When inserted into the sheet metal, portions of the arms of the retainer 250 and the carrier 264 extend outwardly to contact the upper portion of the sheet metal. The wedges 268 of the retainer snap outwardly after insertion to hold the clip 210 against the lower surface at the corners of the sheet metal. The wedges 68 and arms 222, 270 of the retainer and carrier hold the clip 210 from displacement from the aperture.

Figure 16:
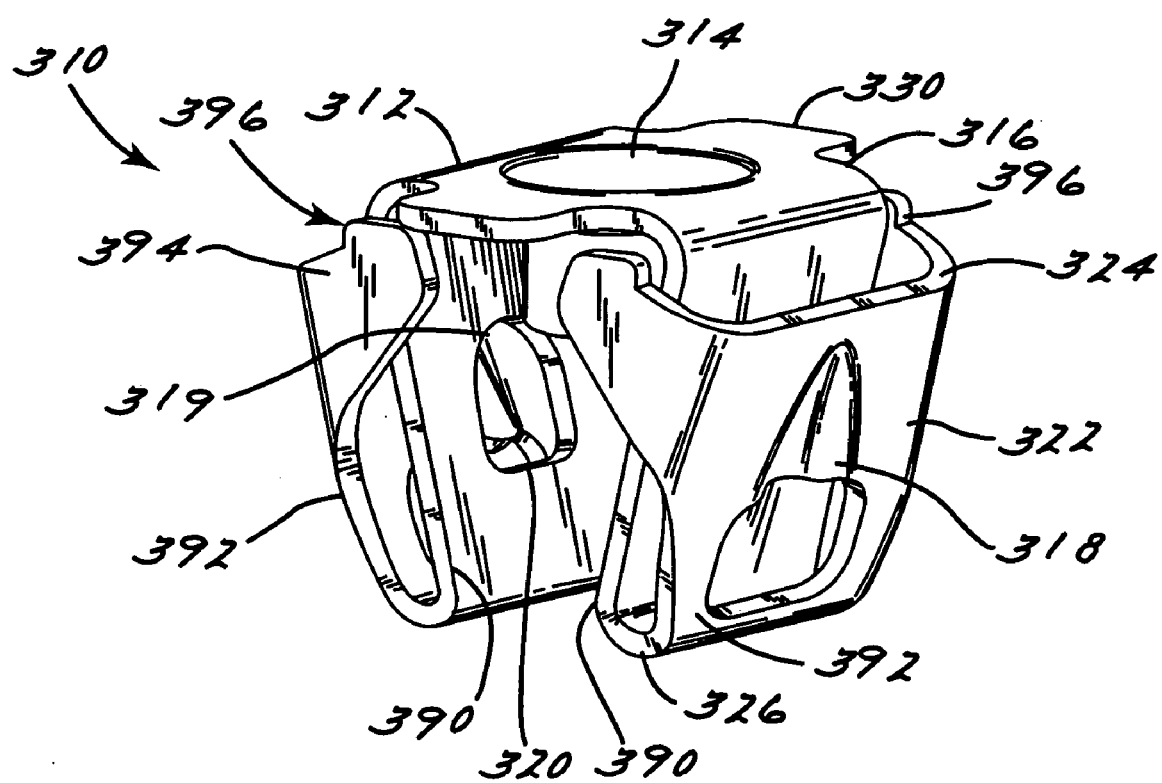
FIG. 16 is a perspective view of an alternative preferred embodiment of a fastener mounting clip assembly.
Figure 17:
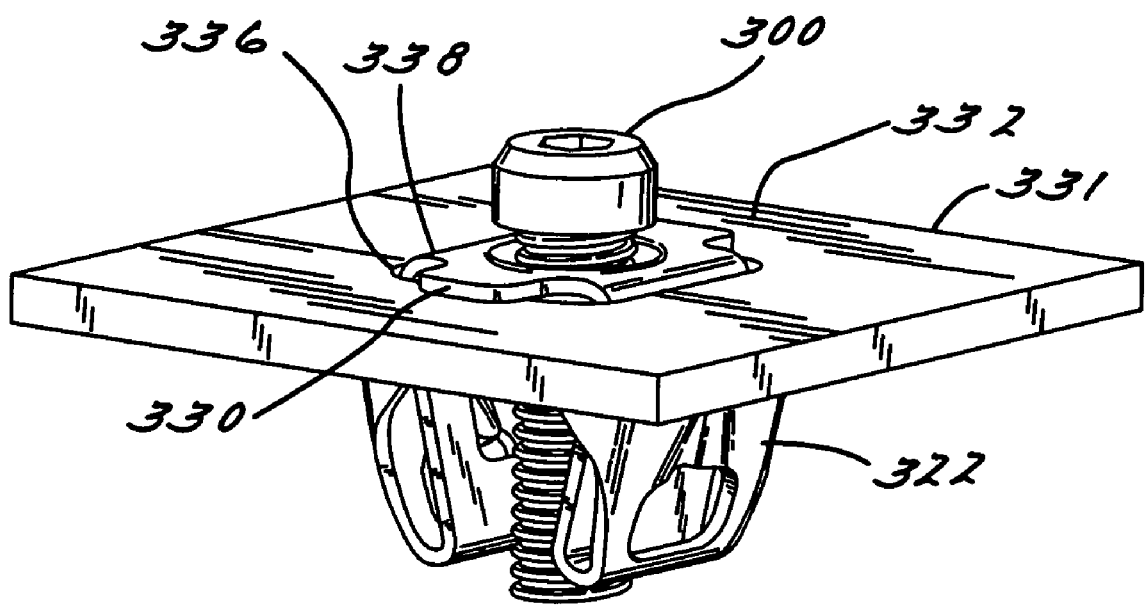
FIG. 17 is a perspective view of the fastener mounting clip assembly of FIG. 16 disposed in a bore hole formed in a piece of sheet material.
Figure 18:
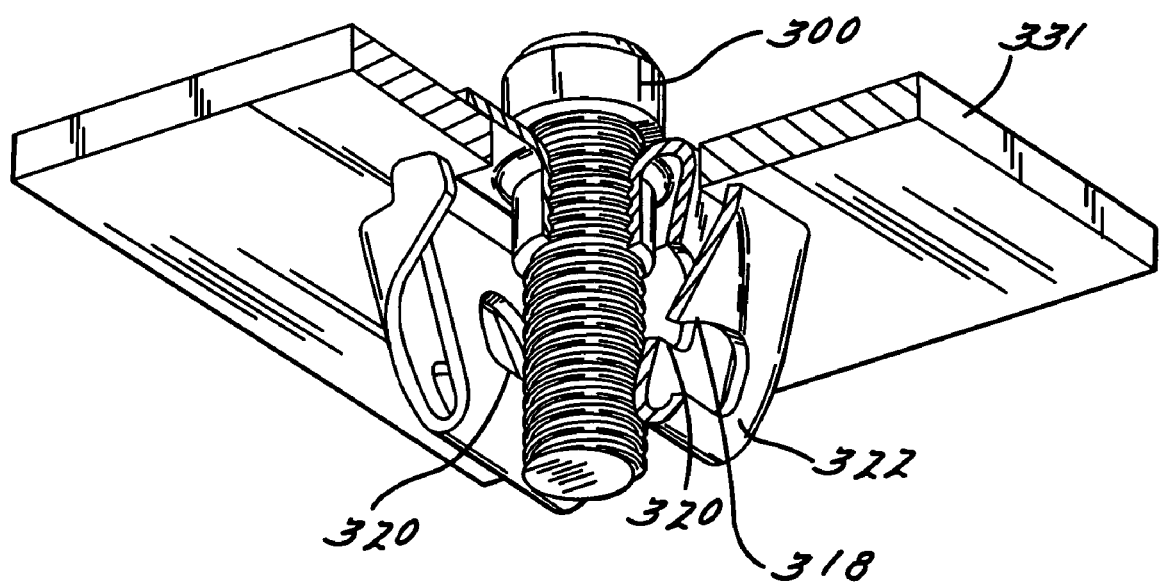
FIG. 18 is a partially cut away perspective view of the fastener mounting clip assembly of FIG. 17.

As shown in FIGS. 16–18, an additional embodiment of a fastener mounting clip 310 is formed from a single sheet of metal such as spring steel, aluminum, tin or copper for insertion into an aperture. However, other materials such as resiliently rigid plastic materials may be suitable for the intended purpose as according to the invention.

The fastener mounting clip 310 includes a planar surface 312 preferably formed in a rectilinear shape. However, it is appreciated that various other shapes may be suitable for the intended purpose without exceeding the scope of the invention.

The planar surface 312 includes a nut base 314 formed central thereto that is dimensioned to receive and retain a complementary fastener 300 therein. The nut base 314 may be threaded, barded, or provide any other complementary engagement means for securing a conventional fastener.

Two resilient retaining arms 322 are formed on the outside edge 316 of the planar surface 312. The retaining arms 322 extend beneath the planar surface 312. Preferably, the retaining arms 322 include a top end 324 and a bottom end 326 which are essentially the extreme ends of the retaining arms 322 that are preferably formed to resemble elongated loops comprising inner panel 390 and outer panel 392. The retaining arms 322 are operative to compress and expand upon insertion of the fastener mounting clip 310 into the aperture 332 formed in the sheet material wherein the top ends 324 of the retaining arms 322 abut against a bottom surface of the sheet material when the fastener mounting clip 310 is fully inserted into the aperture 332. The top ends 324 of the retaining arms extend along under a perimetal edge 338 of the aperture 332 between corners 336 of the aperture 332. The corners of the aperture are more resistant to bending than the perimetal edge between corners 336. Thus, when the clip is subjected to an extraction force, engagement of the corners provides high resistance to extraction forces. The retaining arms 322 are preferably formed or stamped to have a "v" shaped barb or hook 318 in the outer panel 392 which will overlie a supporting edge 320 of a window or aperture 319 formed or punched in inner panel 390. If an extraction force is applied to the clip, the upward force will tend to cause the inner panels 390 of the retaining arms 322 to rise relative to the sheet 331, while the outer panel 392 is restrained from upward movement by engagement of the top edge 324 with the bottom surface of sheet 331, thus tending to cause the unshaped bottom edge 326 to deform. The barb 318 engages the supporting edge 320 and transmits a portion of the retention forces directly to the inner panel 390 and lessens the stress upon the bottom end 326.

At least two support tabs 330 extend outwardly from the outside edge 316 of the planar surface 312. Preferably, the tabs 330 are arranged in an opposing fashion such that they extend outwardly from the planar surface 312 at substantially 180 degrees. The support tabs 330 are operative to abut against a top surface of the sheet material when the fastener mounting clip 310 is fully inserted into the aperture 332 formed in the sheet material. As such, the fastener mounting clip 310 is securely retained in the bore hole or aperture 332 formed in the sheet material wherein the top ends 324 of the retaining arms 322 abut against the bottom surface of the sheet material adjacent the corners and wherein the support tabs 330 abut against the top surface of the sheet material. In this fashion, the fastener mounting clip 310 has high resistance to extraction forces. The tabs 330 also serve to stabilize the fastener mounting clip 310 within the aperture 332.

Retaining arms 322 each further include a pair of retaining tabs 394 extending from the top edge 324 of the outer panel 392. These retaining tabs 394 have engagement surfaces 396 and extend at an angle from the outer panel 392 that is slightly greater than 90°. Thus, the tabs 394 of each retaining arm 322 will be compressed toward each other during insertion into the aperture 332. Once inserted, as shown in FIGS. 17 and 18, the tabs 394 will be biased to return to their slightly skewed-from-orthogonal position such that the tabs 394 will engage opposing vertical surfaces of the perimetal edge 338 and tend to position the clip laterally within the aperture 332. Thus, the one-piece clip engages each of the perimetal edges of the aperture within the sheet material, providing greater resistance to extraction forces perpendicular to the sheet material, but also providing greater resistance to extraction forces having a lateral component.

The retaining tabs 394 also resist splaying of the retaining arms 322 and ensure alignment of the barb 318 with the supporting edge 320. As seen in FIG. 16, there is a gradual slope 395 to tab 394 between the top edge 324 and the engagement surface 396. Upon insertion, the top edge 324 will slide below the bottom surface of the sheet 331, allowing the retaining arms 322 to begin to expand. However, once the tabs 330 rest upon the top surface of the sheet 331, the vertical surface of the perimetal edge 338 will engage the sloped surface 395 of the tab 394 and prevent further expansion of the retaining arms 322, resulting in a spring tension holding the clip in place and centered in the aperture 332. If an extraction force is applied to the clip, the upward force will tend to cause the top edge 324 of the outer panels 392 of the retaining arms 322 to splay outwardly away from the clip 310 due to the angle with respect to the sheet. Therefore, engagement surfaces 396 of retaining tabs 394 are disposed slightly above the plane of the bottom surface of sheet 331, and thus, the engagement surfaces 396 of retaining tabs 394 will engage the vertical edge 338 of the sheet material 331 and provide a secure stop to limit splaying of the retaining arms 322 when an upward extraction force is generated on the fastener Although the preferred embodiment employs two retaining arms 322, the inventive fastener mounting clip 310 could be made operative with at least one retaining arm. The retaining arms 322 are preferably arranged in opposing fashion such that the retaining arms 322 also stand substantially 180 degrees apart.

The fastener mounting clip 310 includes a spaced distance between the support tabs 330 and the top ends 324 of the retaining arms 322 which approximates the thickness of the sheet material for which the fastener mounting clip 310 is to be used. This distance and the resiliency of the support tabs 330 are operative to compensate for surface inconsistencies as well as to ensure that the sheet material will be snugly sandwiched between the top ends 324 of the retaining arms 322 and the support tabs 330 after the fastener mounting clip 310 has been inserted into the aperture.

From the foregoing it can be seen that the above embodiments provide a fastener mounting clip for use in securing a fastener in a bore hole formed in sheet material or a body formed thereof. Having described the invention, however, many modifications thereto may become apparent to those skilled in the art to which it pertains without deviation from the spirit of the invention as defined by the scope of the appended claims.

What is claimed is:

1. A fastener mounting clip for securing a fastener in an aperture in sheet of material extending between an upper surface and a lower surface of said sheet of material, said aperture defined by a plurality of opposing edges, said mounting clip comprising:

a base portion having a threaded aperture to receive the fastener;

a pair of opposed tabs extended from the base to engage a top surface of said sheet material;

at least one retaining arm depending downwardly from said base, said retaining arm having a resiliently deformable outer retaining panel to permit insertion of said clip into said aperture and to engage the lower surface of said sheet material along one of said edges once inserted, and an inner retaining panel, one of said inner and outer retaining panels having a lateral support surface and the other of said inner and outer retaining panels having a barb for engaging said lateral support surface to resist extraction, wherein said barb is formed as a deflection of said other of said inner and outer panels, said barb having a V-shaped configuration where said barb meets said other of said inner and outer panels.

2. The fastener mounting clip of claim 1 comprising a plurality of retaining arms.

3. The fastener mounting clip of claim 2 comprising a plurality of retaining tabs disposed on each retaining arm.

4. The fastener mounting clip of claim 3 wherein each retaining arm has a pair of retaining tabs disposed proximate its upward end and disposed at its opposite lateral edges.

5. The fastener mounting clip of claim 1 formed of a single piece of sheet material.

6. The fastener mounting clip of claim 1 wherein said aperture is rectilinear.

7. The fastener mounting clip of claim 1 wherein said retaining arms are generally u-shaped.

8. The fastener mounting clip of claim 1 wherein each retaining arm includes at least one retaining tab having an upwardly extending surface to engage a vertical edge of said aperture to resist splaying of said outer retaining panel with respect to said sheet of material.

9. The fastener assembly of said claim 1 wherein said outer retaining panel has an engagement surface at its upper edge.

10. The fastener clip of claim 1 wherein said lateral support surface is located on said inner retaining panel.

11. The fastener mounting clip of claim 1 wherein said outer retaining panel has an engagement surface and a lower surface on said bard and wherein said engagement surface and said lower surface face approximately opposite directions.

12. The fastener mounting clip of claim 1 wherein said outer retaining panel includes said barb and an outer opening.

13. The fastener mounting clip of claim 1 further including an outer opening on said outer retaining arm.

14. The fastener mounting clip of claim 13 wherein said outer retaining arm includes an engagement surface and wherein said engagement surface and said outer opening are arranged on opposing sides of said barb.

15. A fastener mounting clip for securing a fastener in an aperture in a sheet of material extending between an upper surface and a lower surface of said sheet of material, said aperture defined by a plurality of opposing edges, said mounting clip comprising:

a base portion having a threaded aperture to receive the fastener;

a pair of opposed tabs extended from the base to engage a top surface of said sheet material;

at least one retaining arm depending downwardly from said base, said retaining arm having a resiliently deformable outer retaining panel to permit insertion of said clip into said aperture and to engage the lower surface of said sheet material along one of said edges once inserted, said retaining panel having at least one retaining tab with an upwardly extending surface to engage a vertical edge of said aperture to resist splaying of said retaining panel with respect to said sheet of material and wherein said retaining arm includes an inner retaining panel, one of said inner and outer retaining panels having a lateral support surface and the other of said inner and outer retaining panels having a barb for engaging said lateral support surface to resist extraction, wherein said barb is formed as a deflection of said other of said inner and outer panels, said barb having a V-shaped configuration where said barb meets said other of said inner and outer panels.

16. The fastener mounting clip of claim 15 comprising a plurality of retaining arms.

17. The fastener mounting clip of claim 16 wherein said retaining arms are generally u-shaped.

18. The fastener mounting clip of claim 16 comprising a plurality of retaining tabs disposed on each retaining arm.

19. The fastener mounting clip of claim 18 wherein each retaining arm has a pair of retaining tabs disposed proximate its upward end and disposed at its opposite lateral edges.

20. The fastener mounting clip of claim 15 formed of a single piece of sheet material.

21. The fastener mounting clip of claim 15 wherein said retaining arm comprises a downwardly depending panel and an engagement panel extending upwardly therefrom.

22. The fastener clip of claim 15 wherein said upwardly extending surface of said retaining tab is above said engagement panel of said retaining arm.

23. The fastener mounting clip of claim 15 further including an engagement surface on said outer retaining panel and a lower surface on said barb and wherein said engagement surface and said lower surface face approximately opposing directions.

24. A fastener mounting clip for securing a fastener in an aperture in sheet of material extending between an upper surface and a lower surface of said sheet of material, said aperture defined by a plurality of opposing edges, said mounting clip comprising:

a base portion having a threaded aperture to receive the fastener;

a pair of opposed tabs extended from the base to engage a top surface of said sheet material;

at least one retaining arm depending downwardly from said base, said retaining arm having a resiliently deformable outer retaining panel to permit insertion of said clip into said aperture and to engage the lower surface of said sheet material along one of said edges once inserted, and an inner retaining panel, one of said inner and outer retaining panels having an opening with a supporting edge and the other of said inner and outer retaining panels having a barb for engaging said supporting edge to resist extraction, said barb extending toward said opening and having a V-shape where said barb meets said other of said inner and outer retaining panels and wherein said outer retaining panel includes a planar engagement portion for engaging the lower surface of the sheet of material, said planar engagement portion is spaced from said barb.

25. The fastener mounting clip of claim 24 further including a convex shaped lower edge on said barb.

* * * * *

UNITED STATES PATENT AND TRADEMARK OFFICE
CERTIFICATE OF CORRECTION

| | | |
|---|---|---|
| PATENT NO. | : 7,226,260 B2 | Page 1 of 1 |
| APPLICATION NO. | : 11/138562 | |
| DATED | : June 5, 2007 | |
| INVENTOR(S) | : Nicholas Jackson, Jr. et al. | |

It is certified that error appears in the above-identified patent and that said Letters Patent is hereby corrected as shown below:

Column 7, line 46, "unshaped" should be --u-shaped--.

Column 9, line 42, Claim 11, "bard" should be --barb--.

Signed and Sealed this

Tenth Day of July, 2007

JON W. DUDAS
*Director of the United States Patent and Trademark Office*